United States Patent Office 3,271,385
Patented Sept. 6, 1966

3,271,385
CARBAMOYL DERIVATIVES OF LINCOMYCIN
AND PROCESSES FOR PRODUCING THEM
David G. Martin, Kalamazoo, Mich., assignor to The
Upjohn Company, Kalamazoo, Mich., a corporation of
Delaware
No Drawing. Filed Apr. 13, 1964, Ser. No. 359,504
8 Claims. (Cl. 260—210)

This invention relates to novel compositions of matter and to a process for the preparation thereof and is particularly directed to novel 2,7-di-O-carbamoyl derivatives of lincomycin and to intermediates thereof and to processes for producing the same.

Lincomycin is an antibiotic obtained as an elaboration product of a lincomycin-producing actinomycete. Methods for the production, recovery, and purification of lincomycin are described in U.S. Patent 3,086,912.

It has now been found that novel compounds according to this invention are obtained by reacting 3,4-O-isopropylidenelincomycin with a lower alkyl isocyanate to produce a 3,4-O-isopropylidenelincomycin 2,7-bis(lower-alkylcarbamate) (I) which upon acid hydrolysis is converted to a lincomycin 2,7-bis(lower-alkylcarbamate) (II).

Subsequent to this invention the structure of lincomycin has been elucidated. The novel compounds of the invention, therefore, can now be represented by the following formulae:

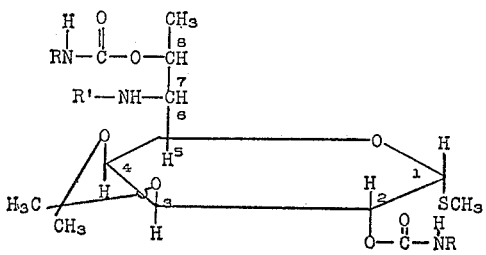

(I)

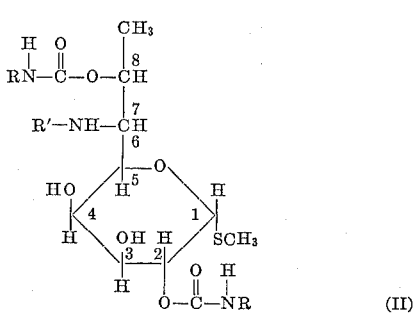

(II)

wherein R is lower-alkyl; and wherein R' is trans-4-propyl-L-hygroyl.

The term "lower alkyl" whenever used in the specification or claims refers to alkyl of 1 to 8 carbon atoms, inclusive, e.g., methyl, ethyl, propyl, butyl, amyl, hexyl, heptyl, octyl, and the isomeric forms thereof.

The novel compounds of the invention, 3,4-O-isopropylidenelincomycin 2,7-bis(lower-alkylcarbamates) have pharmacological activity in mice. For example, 3,4-O-isopropylidenelincomycin 2,7-bis(methylcarbamate) showed sedative activity in mice. Therefore, these compounds can be used to quiet laboratory mice, thus easing the handling problems encountered with mice. Further, these novel compounds can be used as an intermediate to make the novel compounds lincomycin 2,7-bis(lower-alkylcarbamates). These latter compounds are useful as appetite depressants in mice. For example, lincomycin 2,7-bis(ethylcarbamate) depressed the desire to take food for over eight hours when administered to laboratory mice.

The novel compounds of the invention, 3,4-O-isopropylidenelincomycin 2,7-bis(lower-alkylcarbamates), lincomycin 2,7-bis(lower-alkylcarbamates), 3,4-O-isopropylidenelincomycin 2-(lower-alkylcarbamates), 3,4-O-isopropylidenelincomycin 7-(lower-alkylcarbamates), lincomycin 2-(lower-alkylcarbamates), and lincomycin 7-(lower-alkylcarbamates) are useful in accordance with U.S. Patents 1,915,334 and 2,075,359, in preparing amine fluosilicate mothproofing agents.

It has now been found that novel compounds according to this invention, 3,4-O-isopropylidenelincomycin 2,7-bis-(lower-alkylcarbamates) (I) are obtained by reacting 3,4-O-isopropylidenelincomycin with an appropriate lower alkyl isocyanate in the presence of a tertiary amine. For example, on reacting 3,4-O-isopropylidenelincomycin with ethyl isocyanate in the presence of pyridine, 3,4-O-isopropylidenelincomycin 2,7-bis(ethylcarbamate) is obtained (I, R=$C_2H_5$). Likewise, on reacting 3,4-O-isopropylidenelincomycin with propyl isocyanate in the presence of pyridine, 3,4-O-isopropylidenelincomycin 2,7-bis(propylcarbamate) is obtained (I, R=n—$C_3H_7$).

In a similar manner, but using limited amounts of lower alkyl isocyanate, there is obtained a mixture of 3,4-O-isopropylidenelincomycin 2,7-bis(lower-alkylcarbamate), 3,4-O-isopropylidenelincomycin 2-(lower-alkylcarbamate) and 3,4-O-isopropylidenelincomycin 7-(lower-alkylcarbamate). This mixture is readily separated into its component parts by column chromatography and thin layer chromatography. 3,4-O-isopropylidenelincomycin 2-(lower-alkylcarbamate) and 3,4-O-isopropylidenelincomycin 7-(lower-alkylcarbamate) can be converted to lincomycin 2-(lower-alkylcarbamate) and lincomycin 7-(lower-alkylcarbamate), respectively, by hydrolyzing the same with a dilute acid.

Suitable amines include heterocyclic amines such as pyridine, quinoline, isoquinoline; trialkylamines such as trimethylamine, triethylamine, triisopropylamine, and the like; N,N-dialkylanilines such as dimethylaniline, diethylaniline, and the like; and N-alkylpiperidines such as N-ethylpiperidine, N-methylpiperidine, and the like. The preferred amine is pyridine. The reaction is conducted advantageously by treating a suspension of 3,4-O-isopropylidenelincomycin in the tertiary amine with a lower alkyl isocyanate and heating the resulting mixture, if desired, for a short period at about 100° C. to complete the reaction.

It has also been found that novel compounds according to this invention, lincomycin 2,7-bis(lower-alkylcarbamates) (II), are obtained by subjecting 3,4-O-isopropylidine lincomycin 2,7-bis(lower-alkylcarbamates) (I) to acid hydrolysis. For example, on hydrolyzing 3,4-O-isopropylidenelincomycin 2,7-bis(ethylcarbamate) (I, R=$C_2H_5$) with 0.25 N hydrochloric acid there is obtained lincomycin 2,7-bis(ethylcarbamate) (II, R=$C_2H_5$). Likewise, on hydrolyzing 3,4-O-isopropylidenelincomycin 2,7-bis(propylcarbamate) (I, R=n—$C_3H_7$) with 0.25 N hydrochloric acid, there is obtained lincomycin 2,7-bis(propylcarbamate) (II, R=n—$C_3H_7$).

The following examples are illustrative of the process and products of the present invention but are not to be construed as limiting.

PREPARATION OF 3,4-O-ISOPROPYLIDENE-
LINCOMYCIN

A solution of 9.8 gm. of lincomycin in 150 m. of acetone is added to a solution of 9.8 gm. of p-toluene-sulfonic acid monohydrate in 100 ml. acetone with good stirring and avoidance of exposure to moisture. The mixture is stirred at ambient temperature for 1 hour, after which 100 ml. of anhydrous ether is added and stirring is continued in an ice-bath for 0.5 hour. The mixture is filtered and the solid product is dried in vacuo at 50° C.; yield 13.35 gm. (85.5%) of 3,4-O-isopropylidenelincomycin. An additional 1.15 g. (7.4%) can be recovered from the mother liquors by adding 350 ml. of anhydrous ether to the mother liquor from the previous filtering operation and chilling the solution for 1 hour. The 14.5 gm. so obtained are suspended in 200 ml. of ether and shaken vigorously with 125 ml. of 5% potassium bicarbonate solution. The aqueous layer is back-extracted with two 100-ml. portions of ether. The ether extracts are washed with 50 ml. of saturated sodium chloride solution and then filtered through anhydrous sodium sulfate. The ether is evaporated under vacuum leaving 7.9 gm. (73.1%) of 3,4-O-isopropylidenelincomycin which is dissolved in 25 ml. of ethyl acetate and concentrated to about 10 to 15 ml. The concentrate is allowed to stand at room temperature for several hours and then refrigerated overnight. The crystals are filtered from the solution and washed sparingly with cold ethyl acetate; yield 4.55 gm. (42.2%) of 3,4-O-isopropylidenelincomycin having a melting point of 126–128° C., and an optical rotation of $[\alpha]_D^{25}+101-102°$ (c. 1, MeCl$_2$).

*Example 1.—3,4-O-isopropylidenelincomycin 2,7-bis (ethylcarbamate)*

A solution of 12.0 gm. of 3,4-O-isopropylidenelincomycin in 32 ml. of pyridine and 16 ml. of ethyl isocyanate in a sealed Pyrex pressure tube was heated at 100° C. for 4 hours. The solution was evaporated under reduced pressure and the solid residue recrystallized from acetone-water. 3,4 - O - isopropylidenelincomycin 2,7 - bis(ethylcarbamate) was collected, washed with aqueous acetone, and dried; yield 91%; melting point, 180–181° C. which after recrystallization from acetone-water was 181–181.5° C.; and infrared absorption bands at 3340, 3290, 2760, 1690, and 1660$^{-cm}$. 3,4-O-isopropylidenelincomycin 2,7-bis(ethylcarbamate) had the following elemental analysis:

Calcd. for $C_{27}H_{48}N_4O_8S$: C, 55.08; H, 8.22; N, 9.52; S, 5.45. Found: C. 55.12; H, 8.21; N, 9.55; S, 5.90.

*Example 2.—Lincomycin 2,7-bis(ethylcarbamate)*

The 3,4-O-isopropylidenelincomycin 2,7-bis(ethylcarbamate) from Example 1 was dissolved in 700 ml. of 0.25 N hydrochloric acid with stirring. After 5 hours, 40 gm. of potassium bicarbonate was added and the solution was extracted first with methylene chloride, then diluted with 400 ml. of brine and extracted with two additional portions of methylene chloride. The extracts were combined, dried over sodium sulfate, and concentrated to dryness under reduced pressure. The residue was dissolved in 80 ml. of acetone. Dilution with approximately 630 ml. of cyclohexane and rubbing the side of the flask with a glass rod afforded 10.65 gm. of lincomycin 2,7-bis(ethylcarbamate) having a melting point of 123–125° C. The filtrate upon further dilution with cyclohexane yielded a second crop of 0.85 gm. having a melting point of 121–123° C. After recrystallization several times from the same solvents as used above, lincomycin 2,7-bis(ethylcarbamate) had a melting point of 123–125° C.; an optical rotation of $[\alpha]_D^{25}$ +111° (c.=0.864 in acetone); I.R. absorption bands at 3530, 3320, 2780, 1725, 1695; and the following elemental analysis:

Calcd. for $C_{24}H_{44}N_4O_8S$: (.0148 $C_6H_{12}$)

I.R. melt solvate indicated this sample contained 1.48% cyclohexane.

C, 52.61; H, 8.10; N, 10.19; S, 5.83. Found: C, 53.17; H, 8.20; N, 10.34; S, 5.87.

*Example 3*

By substituting the ethyl isocyanate in Example 1 by methyl, propyl, butyl, amyl, hexyl, heptyl, and octyl isocyanate, 3,4-O-isopropylidenelincomycin 2,7-bis(methylcarbamate),
3,4-O-isopropylidenelincomycin 2,7-bis(propylcarbamate),
3,4-O-isopropylidenelincomycin 2,7-bis(butylcarbamate),
3,4-O-isopropylidenelincomycin 2,7-bis(amylcarbamate),
3,4-O-isopropylidenelincomycin 2,7-bis(hexylcarbamate),
3,4-O-isopropylidenelincomycin 2,7-bis(heptylcarbamate), and
3,4-O-isopropylidenelincomycin 2,7-bis(octylcarbamate)

are obtained.

*Example 4*

Hydrolysis of 3,4-O-isopropylidenelincomycin 2,7-bis(methylcarbamate),
3,4-O-isopropylidenelincomycin 2,7-bis(propylcarbamate),
3,4-O-isopropylidenelincomycin 2,7-bis(butylcarbamate),
3,4-O-isopropylidenelincomycin 2,7-bis(amylcarbamate),
3,4-O-isopropylidenelincomycin 2,7-bis(hexylcarbamate),
3,4-O-isopropylidenelincomycin 2,7-bis(heptylcarbamate), and
3,4-O-isopropylidenelincomycin 2,7-bis(octylcarbamate)

according to the procedure of Example 2 produces lincomycin 2,7-bis(methylcarbamate),
lincomycin 2,7-bis(propylcarbamate),
lincomycin 2,7-bis(butylcarbamate),
lincomycin 2,7-bis(amylcarbamate),
lincomycin 2,7-bis(hexylcarbamate),
lincomycin 2,7-bis(heptylcarbamate), and
lincomycin 2,7-bis(octylcarbamate), respectively.

*Example 5*

PART A.—3,4-O-ISOPROPYLIDENELINCOMYCIN 2-(ETHYLCARBAMATE) AND 3,4-O-ISOPROPYLIDENELINCOMYCIN 7-(ETHYLCARBAMATE)

3,4-O-isopropylidenelincomycin (2.0 gm., 4.48 millimoles) in 4.0 ml. of pyridine was treated with 0.36 ml. (4.56 millimoles) of ethyl isocyanate and allowed to stand at room temperature for one week. The solution was concentrated to dryness under reduced pressure, toluene was added and the solution again concentrated to dryness. The residue was then chromatographed on silica gel (300 gm.) and eluted with acetone:cyclohexane (1:1); 50 ml. fractions were collected and analyzed by thin-layer chromatography. Products, in the order in which they were eluted, were 0.22 gm. of 3,4-O-isopropylidenelincomycin 2,7-bis-(ethylcarbamate); 0.36 gm. of a mixture of the biscarbamate and monocarbamate; 0.42 gm. of monocarbamate contaminated with a trace of biscarbamate; 0.39 gm. of monocarbamate; .19 gm. of a mixture of 3,4-O-isopropylidenelincomycin and monocarbamate; and finally, 0.88 gm. of 3,4-O-isopropylidenelincomycin. On crystallization from acetone: Skellysolve B (isomeric hexanes) the 0.39 gm. of monocarbamate afforded 0.12 gm. of crystalline monocarbamate, melting point 190–191° C.; 0.27 g. of oily monocarbamate obtained by evaporation of the mother liquor was reserved for Part B. Recrystallization from methylene chloride:Skellysolve B afforded 0.10 gm. of 3,4-O-isopropylidenelincomycin 2- or 7-(ethylcarbamate), melting point 187–189° C.

Elemental analysis.—Calculated for $C_{24}H_{43}N_3O_7S$: C, 55.68; H, 8.37; N, 8.12; S, 6.20. Found: C, 55.44; H, 8.48; N, 8.03; S, 6.23.

PART B.—LINCOMYCIN 2- AND 7-(ETHYLCARBAMATES)

The chromatography fractions above which contained monocarbamates contaminated with a trace of biscarbamate (0.42 gm.) and the oily monocarbamate (0.27 gm.) were combined (0.69 gm.) and stirred with 48 ml. of aqueous 0.25 N HCl for 5 hours. The aqueous solution was filtered, neutralized with potassium bicarbonate, saturated with sodium chloride, and extracted with methylene chloride. The extracts were dried over sodium sulfate and concentrated to dryness leaving 0.65 gm. of gummy material. Analysis of this material by thin layer chromatography showed the presence of two monocarbamates in approximattely equal amounts. One has an Rf value of 0.46; the other an Rf value of 0.56. The biscarbamate had an Rf value of 0.64 and lincomycin one of 0.41.

*Example 6*

By substituting the ethyl isocyanate in Example 5, Part A by methyl, propyl, butyl, amyl, hexyl, heptyl, and octyl isocyanate, 3,4-O-isopropylidenelincomycin 2-(methylcarbamate),
3,4-O-isopropylidenelincomycin 2-(propylcarbamate),
3,4-O-isopropylidenelincomycin 2-(butylcarbamate),
3,4-O-isopropylidenelincomycin 2-(amylcarbamate),
3,4-O-isopropylidenelincomycin 2-(hexylcarbamate),
3,4-O-isopropylidenelincomycin 2-(heptylcarbamate),
3,4-O-isopropylidenelincomycin 2-(octylcarbamate),
3,4-O-isopropylidenelincomycin 7-(methylcarbamate),
3,4-O-isopropylidenelincomycin 7-(propylcarbamate),
3,4-O-isopropylidenelincomycin 7-(butylcarbamate),
3,4-O-isopropylidenelincomycin 7-(amylcarbamate),
3,4-O-isopropylidenelincomycin 7-(hexylcarbamate),
3,4-O-isopropylidenelincomycin 7-(heptylcarbamate), and
3,4-O-isopropylidenelincomycin 7-(octylcarbamate)

are obtained.

*Example 7*

Hydrolysis of 3,4-O-isopropylidenelincomycin 2-(methylcarbamate), 3,4-O-isopropylidenelincomycin 2-(propylcarbamate), 3,4-O-isopropylidenelincomycin 2-(butylcarbamate), 3,4-O-isopropylidenelincomycin 2-(amylcarbamate), 3,4-O-isopropylidenelincomycin 2-(hexylcarbamate), 3,4-O-isopropylidenelincomycin 2-(heptylcarbamate), 3,4-O-isopropylidenelincomycin 2-(octylcarbamate), 3,4-O-isopropylidenelincomycin 7-(methylcarbamate), 3,4-O-isopropylidenelincomycin 7-(propylcarbamate), 3,4-O-isopropylidenelincomycin 7-(butylcarbamate), 3,4-O-isopropylidenelincomycin 7-(amylcarbamate), 3,4-O-isopropylidenelincomycin 7-(hexylcarbamate), 3,4-O-isopropylidenelincomycin 7-(heptycarbamate), and 3,4-O-isopropylidenelincomycin 7-(octylcarbamate) according to the procedure of Example 5, Part B produces lincomycin 2-(methylcarbamate), lincomycin 2-(propylcarbamate), lincomycin 2-(butylcarbamate), lincomycin 2-(amylcarbamate), lincomycin 2-(hexylcarbamate), lincomycin 2-(heptylcarbamate), lincomycin 2-(octylcarbamate), lincomycin 7-(methylcarbamate), lincomycin 7-(propylcarbamate), lincomycin 7-(butylcarbamate), lincomycin 7-(amylcarbamate), lincomycin 7-(hexylcarbamate), lincomycin 7-(heptylcarbamate), and lincomycin 7-(octylcarbamate) respectively.

I claim:
1. A compound of the formula:

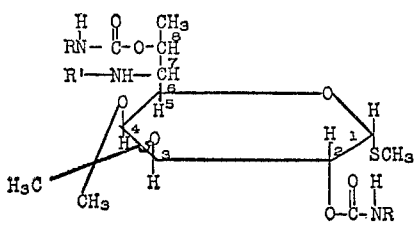

(I)

wherein R is lower-alkyl; and wherein R' is trans-4-propyl-L-hygroyl.

2. A compound of the formula:

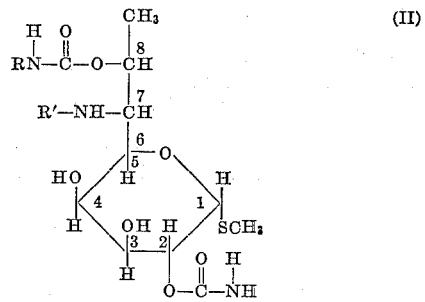

(II)

wherein R is lower-alkyl; and wherein R' is trans-4-propyl-L-hygroyl.

3. 3,4-O-isopropylidenelincomycin 2,7-bis(ethylcarbamate).

4. Lincomycin 2,7-bis(ethylcarbamate).

5. A compound of the formula:

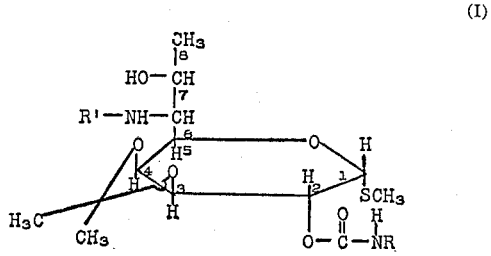

(I)

wherein R is lower-alkyl; and wherein R' is trans-4-propyl-L-hygroyl.

6. A compound of the formula:

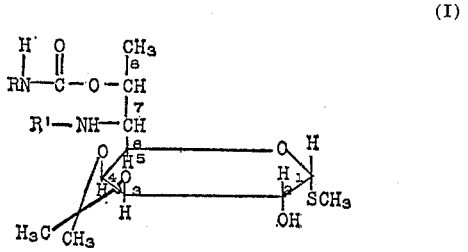

(I)

wherein R is lower-alkyl; and wherein R' is trans-4-propyl-L-hygroyl.

7. A compound of the formula:

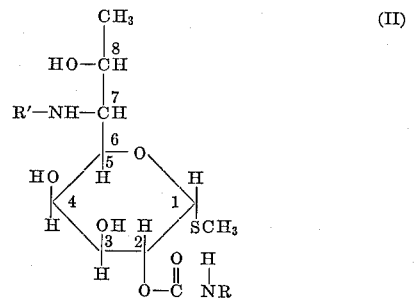

(II)

wherein R is lower-alkyl; and wherein R' is trans-4-propyl-L-hygroyl.

8. A compound of the formula:

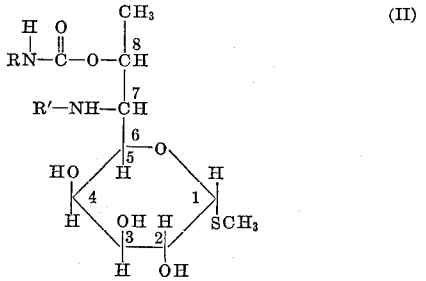

(II)

wherein R is lower-alkyl; and wherein R' is trans-4-propyl-L-hygroyl.

References Cited by the Examiner

UNITED STATES PATENTS 2,847,413  8/1958  Folkers et al. -------- 260—210
2,938,900  5/1960  Walton ------------ 260—210

OTHER REFERENCES

Pigman et al.: "Chemistry of the Carbohydrates," 1948, pp. 553–554, Academic Press Inc., New York, New York.

Pigman: "The Carbohydrates," 1957, page 160, Academic Press Inc., New York, New York.

LEWIS GOTTS, *Primary Examiner.*
JOHNNIE R. BROWN, *Assistant Examiner.*